(12) United States Patent
Zanbaghi et al.

(10) Patent No.: US 9,185,767 B2
(45) Date of Patent: Nov. 10, 2015

(54) SELF-OSCILLATING RESONANT CONVERTER-BASED LIGHT EMITTING DIODE (LED) DRIVER

(71) Applicant: Cirrus Logic, Inc., Austin, TX (US)

(72) Inventors: Ramin Zanbaghi, Austin, TX (US); Arnab Kumar Dutta, Austin, TX (US); Firas Azrai, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 14/158,445

(22) Filed: Jan. 17, 2014

(65) Prior Publication Data

US 2014/0312797 A1    Oct. 23, 2014

Related U.S. Application Data

(60) Provisional application No. 61/813,887, filed on Apr. 19, 2013, provisional application No. 61/813,868, filed on Apr. 19, 2013, provisional application No. 61/813,906, filed on Apr. 19, 2013.

(51) Int. Cl.
    *H05B 41/36* (2006.01)
    *H05B 33/08* (2006.01)
    *H02M 7/5383* (2007.01)

(52) U.S. Cl.
    CPC ......... *H05B 33/0872* (2013.01); *H02M 7/5383* (2013.01); *H05B 33/0815* (2013.01); *H05B 33/0866* (2013.01)

(58) Field of Classification Search
    CPC ........... H05B 33/0815; H05B 33/0818; H05B 37/029; H05B 37/02; H05B 41/3925; H05B 41/391; H05B 41/2828; H05B 33/0803
    USPC ...... 315/291, 307, 224, 209 R, 247, 276, 278
    See application file for complete search history.

(56) References Cited

U.S. PATENT DOCUMENTS

| | | | | |
|---|---|---|---|---|
| 5,173,643 | A * | 12/1992 | Sullivan et al. | 315/276 |
| 6,510,995 | B2 | 1/2003 | Muthu et al. | |
| 6,696,803 | B2 * | 2/2004 | Tao et al. | 315/291 |
| 8,369,109 | B2 * | 2/2013 | Niedermeier et al. | 363/17 |
| 8,536,799 | B1 * | 9/2013 | Grisamore et al. | 315/294 |
| 2009/0295300 | A1 * | 12/2009 | King | 315/209 R |
| 2011/0309760 | A1 * | 12/2011 | Beland et al. | 315/201 |
| 2012/0146540 | A1 * | 6/2012 | Khayat et al. | 315/291 |
| 2012/0187997 | A1 * | 7/2012 | Liao et al. | 327/299 |
| 2012/0228954 | A1 * | 9/2012 | Kesler et al. | 307/104 |
| 2013/0175874 | A1 * | 7/2013 | Lou et al. | 307/104 |
| 2013/0200716 | A1 * | 8/2013 | Kesler et al. | 307/104 |

* cited by examiner

*Primary Examiner* — Douglas W Owens
*Assistant Examiner* — Syed M Kaiser
(74) *Attorney, Agent, or Firm* — Norton Rose Fulbright US LLP

(57) ABSTRACT

A self-oscillating resonator (SOR) may be used to control current through light emitting diodes (LEDs). The SOR may be started and stopped by a controller coupled to a transistor switch in the SOR. The controller may output a control signal that starts and stops the SOR by coupling a supply voltage or a ground to a base of the transistor switch in the SOR. Additional control over the current output to the LEDs may be gained through a resistive DAC coupled to the SOR and duty cycling the SOR.

27 Claims, 12 Drawing Sheets

SELF-OSCILLATING RESONANT CONVERTER-BASED LIGHT EMITTING DIODE (LED) DRIVER

This application claims benefit of priority to U.S. Provisional Patent No. 61/813,887 to Ramin Zanbaghi et al. filed on Apr. 19, 2013, and entitled "Current Regulated Self-Oscillating Resonant Converter Based LED Driver Topologies for Residential Applications," and claims benefit of priority to U.S. Provisional Patent Application No. 61/813,906 to Ramin Zanbaghi et al. filed on Apr. 19, 2013, and entitled "Self-Oscillating Resonant Converter Based Dimmable LED Driver Topologies for Residential Applications," and claims benefit of priority to U.S. Provisional Patent Application No. 61/813,868 to Ramin Zanbaghi et al. filed on Apr. 19, 2013, and entitled "Digitally Dimmable LED Driver Topologies with Self-Oscillating Resonant Converter stage (Single Color and Color Mixed LEDs)," each of which is incorporated by reference in its entirety.

FIELD OF THE DISCLOSURE

The instant disclosure relates to lighting. In particular, the instant disclosure relates to driver stages for lighting devices.

BACKGROUND

Driver circuits in lighting devices are used to drive current through a light, such as a compact fluorescent (CFL) tube. In particular, the driver circuit receives an input voltage and outputs an appropriate voltage for the light. For example, a driver circuit may receive a line voltage of 120 Volts at 60 Hertz and output a voltage of approximately 80 Volts at several kilohertz for a CFL tube, or other parameters as required by the specific light. Self-oscillating resonators (SOR) may be used to generate the output voltage of the driver circuit.

FIG. 1 is a circuit illustrating a conventional self-oscillating half-bridge driver for compact fluorescent (CFL) tubes. A circuit 100 includes a start-up stage 102, including a DIAC 104. The circuit 100 also includes a half-bridge self-oscillating resonator stage 112, including transistors 112A and 112B. The circuit 100 further includes a load stage 132, including a CFL bulb 134. An RC timer, including the resistor $R_{start}$ and the capacitor $C_2$, along with the DIAC 104 act to start-up the self-oscillating resonator stage 112 by injecting current into a base of the transistor 112B to start oscillation. A transformer 114 couples the load stage 132 to the transistors 112A and 112B to provide feedback and allow self-oscillation in the stage 112. Thus, the self-oscillating resonator stage 112 acts as a power converter for converting power from a line input voltage to a voltage appropriate for the CFL bulb 134.

However, the circuit 100 of FIG. 1 may not be optimal for use with certain loads, such as light emitting diodes (LEDs). Additionally, the circuit 100 of FIG. 1 provides no control over the power conversion and thus no control over the output of the CFL bulb 134. For example, there is no dimming capability in the circuit 100 of FIG. 1.

Shortcomings mentioned here are only representative and are included simply to highlight that a need exists for improved lighting systems, particularly for consumer-level devices. Embodiments described here address certain shortcomings but not necessarily each and every one described here or known in the art.

SUMMARY

A self-oscillating resonator for power conversion in lighting systems may include a controller coupled to the oscillator to allow control of the power conversion process. In one embodiment, the controller may allow dimming of the light output, such as light emitting diodes (LEDs). In another embodiment, the controller may allow regulation of current through the light output, such as light emitting diodes (LEDs). The controller may start and/or stop oscillation in the self-oscillating resonator (SOR) by generating a pulse signal that is output to a base of a transistor of the self-oscillating resonator. Unlike the conventional DIAC-based start-up of the self-oscillating resonator shown in FIG. 1, the controller may provide increased start-up speed and greater power efficiency.

In one embodiment, an apparatus may include a self-oscillating resonator coupled to a light output node. The self-oscillating resonator may include a first switch, a second switch coupled to the first switch, and an oscillating network having at least one inductor and at least one capacitor, the oscillating network coupled to the first switch and the second switch, and the oscillating network configured to generate an oscillating voltage signal at the light output node. The self-oscillating resonator may also include a controller coupled to the self-oscillating resonator, wherein the controller is configured to start and stop the self-oscillating resonator to regulate a current through a load coupled to the light output node. The controller may be coupled to the self-oscillating resonator through an additional winding of the transformer. The controller may be powered by the self-oscillating resonator through the additional winding of the transformer. The controller may include a variable resistive digital-to-analog converter (DAC) configured to regulate a current through the load coupled to the light output node without starting and stopping the self-oscillating resonator. The controller may include an oscillator sensor configured to detect an output frequency of the self-oscillating resonator and to calculate an approximate line voltage. The self-oscillating resonator may include a line input node coupled to a line voltage, wherein the controller is coupled to an output of the oscillating network, and the controller is configured to sense an oscillation frequency of the oscillating network output; and calculate the line voltage based, at least in part, on the sensed oscillation frequency.

In certain embodiments, the controller may be configured to couple a ground voltage to a base of a switch of the self-oscillating resonator to stop the self-oscillating resonator; apply a pulse voltage to a base of a switch of the self-oscillating resonator to start the self-oscillating resonator; provide over-voltage protection (OVP) for the at least one light emitting diode (LED) by controlling the current through the at least one light emitting diode (LED); start and stop the self-oscillating resonator to control ripple in the at least one light emitting diode (LED); and/or receive a digital dim data input having a ground reference identical to a ground reference for the controller.

In some embodiments, the apparatus may also include at least one light emitting diode (LED) coupled to the light output node, wherein the self-oscillating resonator is configured to control a current through the at least one light emitting diode (LED), and wherein the at least one light emitting diode (LED) may be isolated from the self-oscillating resonator; and/or a sense resistor coupled to the at least one light emitting diode and coupled to the controller, wherein the controller is configured to start and stop the self-oscillating resonator based, at least in part, on a measured current through the sense resistor; a transformer coupled between the oscillating network and the first switch and the at least one light emitting diode (LED).

In another embodiment, a method may include generating an oscillating voltage output at a light output node from an oscillating network of a self-oscillating resonator; starting a self-oscillating resonator by turning on a first switch with a control signal; and/or stopping the self-oscillating resonator with the control signal, wherein the control signal starts and stops the oscillating network to regulate a current through a light output load coupled to the oscillating network.

In some embodiments, the method may also include dimming at least one light emitting diode (LED) coupled to the light output node; generating the control signal from a controller coupled to the self-oscillating resonator; sensing an output of the self-oscillating resonator; determining a line input voltage to the self-oscillating resonator; synchronizing the control with the determined line input voltage; determining an average current through one or more light emitting diodes (LEDs) coupled to the light output node; generating the control signal based, at least in part, on the average current; applying the control signal to a secondary winding of an isolation transformer between the oscillation network of the self-oscillating resonator and the first switch; and/or applying the control signal to a first bipolar junction transistor (BJT).

In a further embodiment, an apparatus may include a light source; a line voltage input node configured to receive a line voltage; a self-oscillating resonator coupled to the light source and coupled to the line voltage input node, wherein the self-oscillating resonator is configured to output power to the light source during an active phase of a period of the line voltage and configured to not output power to the light source during a dimmer phase of the period of the line voltage; and/or a controller coupled to the self-oscillating resonator, wherein the controller is configured to start and to stop the self-oscillating resonator to regulate current through the light source.

In some embodiments, the apparatus may further include a first switch; a second switch coupled to the first switch; a first and second bipolar junction transistor (BJT); and/or a transformer coupled between the self-oscillating resonator and the light source.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 2:
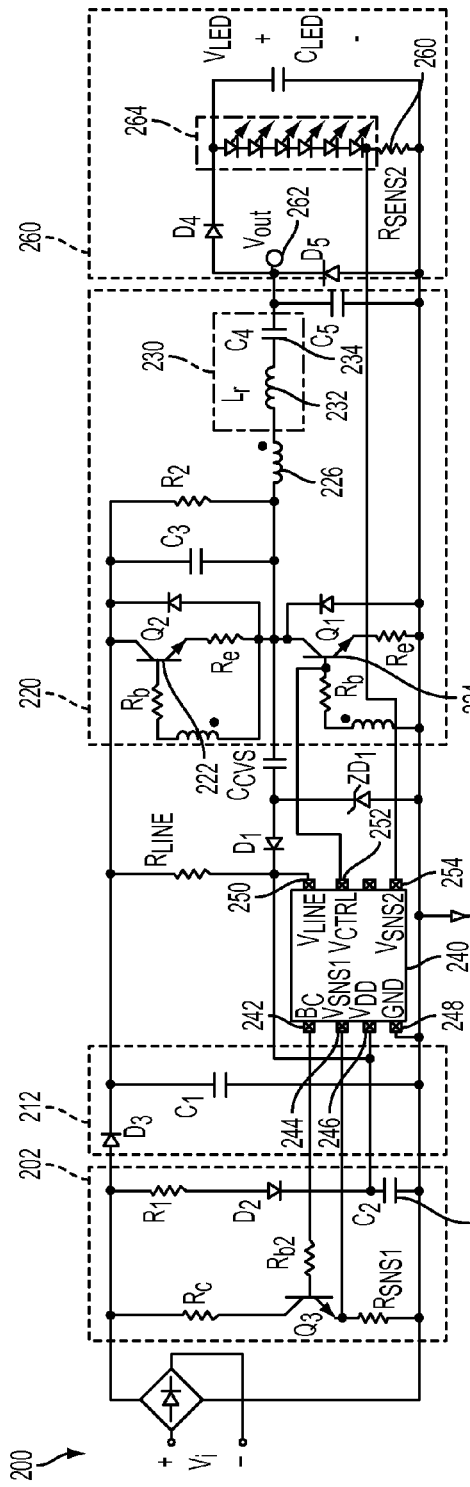
FIG. 2 is a circuit illustrating a dimmer-compatible self-oscillating resonant driver according to one embodiment of the disclosure.

FIG. 2 is a circuit illustrating a dimmer-compatible self-oscillating resonant driver according to one embodiment of the disclosure. A circuit 200 includes a start-up stage 202, which may also provide dimmer compatibility to match a dimmer circuit coupled to the circuit 200 that alters the line input voltage. The start-up stage 202 may be coupled to a peak-rectification stage 212, which is coupled to a controller 240 and a self-oscillating resonator stage 220. The peak-rectification stage 212 may create and maintain a stable voltage for the self-oscillating resonator stage 220. The self-oscillating resonator stage 220 is controlled by the controller 240 to provide power conversion from an input line voltage, Vi, to an output voltage, Vout, at output node 262. The output node 262 may provide power to a load stage 260, which may include light emitting diodes (LEDs) 264.

The self-oscillating resonator stage 220 may include two switches 222 and 224, which may be field effect transistors (FETs) or bipolar junction transistors (BJTs). The switches 222 and 224 may control the start and stop of an oscillation within an oscillator network 230. The oscillator network 230 may include one or more inductors, capacitors, and/or resistors, such as inductor 232 and capacitor 234. The switches 222 and 224 may also turn on and off based on feedback created by the oscillator network 230.

The output voltage, $V_{out}$, may provide an output voltage for powering a load, such as a lighting device. In one embodiment, the load is light emitting diodes (LEDs) 264 and a half-bridge rectifier is coupled to the output node 262 in parallel with the LEDs 264. A resistor 266 may be coupled in series with a load, such as the LEDs 264, to allow sensing of current through the load. The controller 240 may be coupled to the sense resistor 266 and monitor the voltage across the resistor 266. When the resistance of the resistor 266 is known, the controller 240 may compute the current through the LEDs 264 as the monitored voltage across the resistor 266 divided by the known resistance. The controller 240 may then control the circuit 200 to maintain a regulated current through the LEDs 264.

Initially at startup of the circuit 200, an input voltage, $V_i$, is applied to the circuit 200. The controller 240 may receive a supply voltage, $V_{dd}$, at a pin 246 and a ground, gnd, at a pin 248 from a capacitor 204 of the start-up stage 202. The input voltage, $V_i$, may also be input to the controller 240 at pin 250. After start-up, the controller 240 may start the self-oscillating resonator by providing a voltage pulse to a base of the switch 224. The voltage pulse may be generated within the controller 240 and output at a pin 252 coupled to the base of the switch 224 and corresponding to a control voltage, $V_{ctrl}$. Additionally, the line voltage may be sensed through pin 244.

Figure 3:
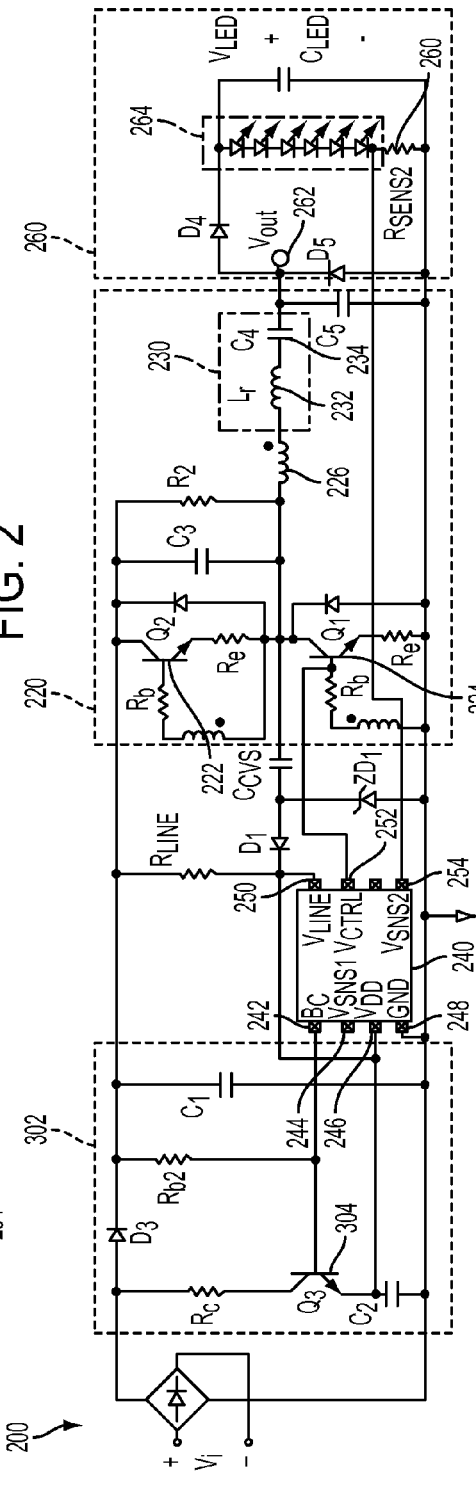
FIG. 3 is a circuit illustrating a dimmer-compatible self-oscillating resonant driver with a different dimmer compatibility circuit than FIG. 2 according to one embodiment of the disclosure.

The circuit 200 of FIG. 2 may be modified for different loads or different dimmer compatibility. For example, the start-up stage 202 may be modified to match a different line voltage dimmer and/or the peak-rectification stage 212 may be removed. For example, FIG. 3 shows a circuit with dimmer compatibility. FIG. 3 is a circuit illustrating a dimmer-compatible self-oscillating resonant driver with a different dimmer compatibility circuit according to one embodiment of the disclosure. A circuit 300 is similar to that of circuit 200 in FIG. 2 but contains a different start-up stage 302 with different dimmer compatibility. In particular, the start-up stage 302 provides dimmer compatibility through a charge-pump scheme using a switch 304 having an emitter coupled to the input voltage, $V_i$. Although two dimmer compatibility stage variations are shown in FIG. 2 and FIG. 3, additional configurations of the circuits 200 and 300 of FIG. 2 and FIG. 3 are possible with the use of the controller 240 for regulating current through light emitting diodes (LEDs) 264. Additionally, other loads, such as compact fluorescent (CFL) bulbs may be coupled in the load stage 260. For example, multiple strings of light emitting diodes (LEDs) may be coupled to the light output node 262 and controlled through switches in series with the additional LED strings.

Figure 4:
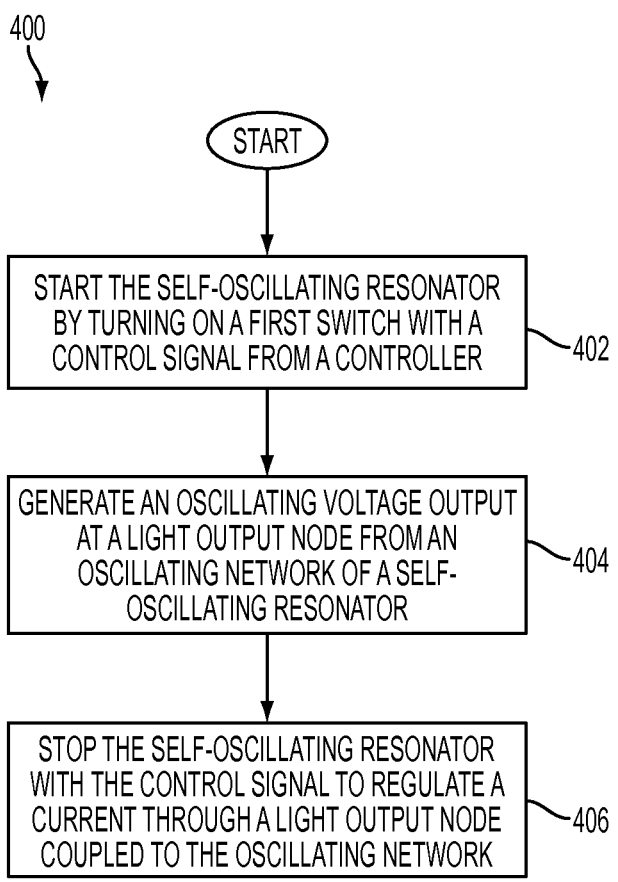
FIG. 4 is a flow chart illustrating a method for driving a load with a self-oscillating resonant driver according to one embodiment of the disclosure.

Operation of the circuits 200 and 300 of FIGS. 2 and 3 by the controller 240 for regulating current through the light emitting diodes (LEDs) 264 may follow a method shown in FIG. 4. FIG. 4 is a flow chart illustrating a method for driving a load with a self-oscillating resonant driver according to one embodiment of the disclosure. A method 400 may include, at block 402, starting the self-oscillating resonator, such as the self-oscillating resonator stage 220 of FIG. 2. The self-oscillating resonator may be started by generating a control signal, such as a voltage pulse, that turns on a first switch, such as the switch 224 of FIG. 2.

At block 404, an oscillating voltage may be generated and output at a light output node by the self-oscillating resonator. For example, the oscillating network 230, such as LC circuit, may self-oscillate and generate the voltage at a frequency defined by the inductance value of the inductor 232 and the capacitance value of the capacitor 234.

At block 406, the self-oscillating resonator may be stopped with the control signal. The controller 240 may determine when to switch off the self-oscillating resonator based on the monitored voltage across the sense resistor 266. In particular, the controller 240 may start the self-oscillating resonator at block 402 and stop the self-oscillating resonator at block 406 to regulate a current through a light output node coupled to the oscillating network of the self-oscillating resonator. In one embodiment, the sense resistor 266 may be monitored to determine when an over-voltage condition exists for the light emitting diodes (LEDs) 264 and over voltage protection (OVP) provided by decreasing current output to the light emitting diodes (LEDs) 264.

Figure 5:
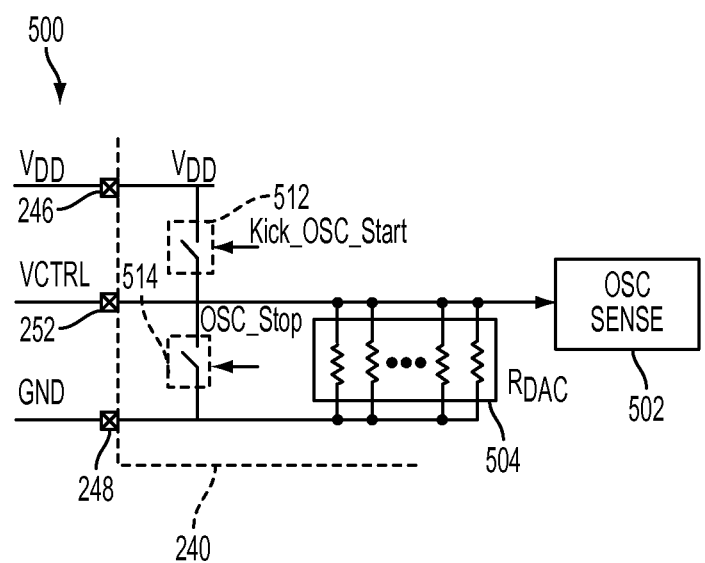
FIG. 5 is a block diagram illustrating a circuit for generating a control signal within a controller according to one embodiment of the disclosure.

The controller 240 may generate the control signal for starting and stopping the self-oscillating resonator through a network of switches as shown in FIG. 5. FIG. 5 is a block diagram illustrating a circuit for generating a control signal within a controller according to one embodiment of the disclosure. A circuit 500 includes a first switch 512 coupled to a second switch 514. The first switch 512 may be coupled to a supply voltage, $V_{dd}$, received at pin 246 of the controller 240. The second switch 514 may be coupled to a ground voltage, gnd, received at the pin 248. The switches 512 and 514 alternate coupling the control signal, $V_{ctrl}$, output at the pin 252 to either the supply voltage, $V_{dd}$, or the ground voltage, gnd. For example, an internal oscillator start signal, Kick_OSC_Start, may be generated and used to control the switch 512 to pull the control signal to the supply voltage, $V_{dd}$. The Kick_OSC_Start signal may be a short pulse to start the switch 222 conducting. After the switch 222 begins conducting, the oscillator network 230 will charge to saturation, at which time the switch 222 will switch off and the switch 224 will turn on, beginning an oscillation cycle. Alternatively, an internal oscillator stop signal, OSC_Stop, may be generated and used to control the switch 514 to pull the control signal, $V_{ctrl}$, to the ground voltage, gnd. When the control signal is pulled to the ground voltage, gnd, the base of the switch 224 is shorted to ground to stop the oscillation of the self-oscillating resonator stage 220.

Figure 1:
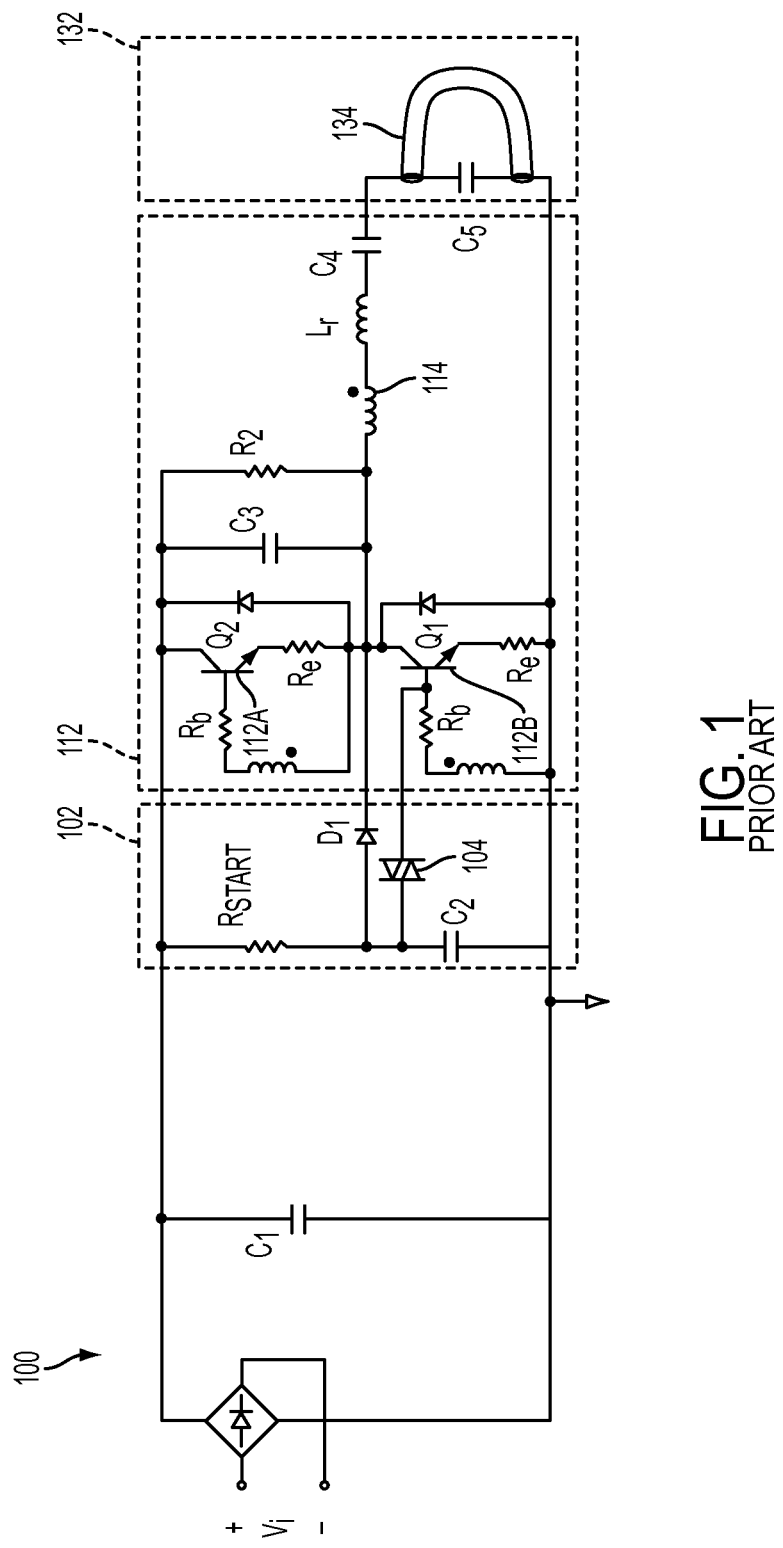
FIG. 1 is a circuit illustrating a conventional self-oscillating half-bridge driver for compact fluorescent (CFL) tubes.
Figure 6:
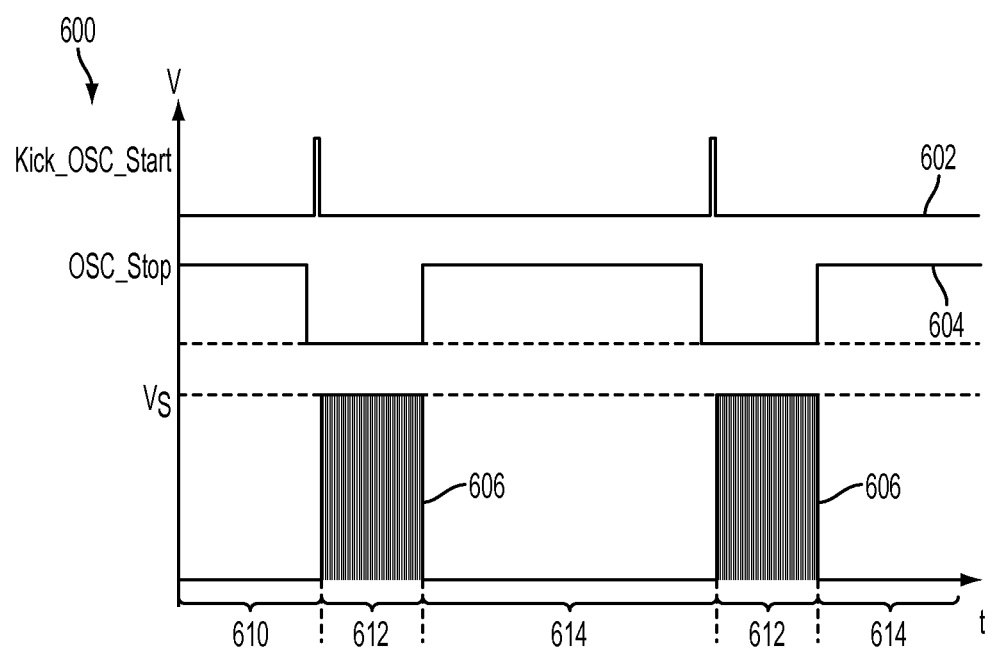
FIG. 6 is a graph illustrating generation of a control signal according to one embodiment of the disclosure.

The operation of the internal Kick_OSC_Start and OSC_Stop signals for generating an oscillating output is shown in FIG. 6. FIG. 6 is a graph illustrating generation of a control signal according to one embodiment of the disclosure. A graph 600 includes a first line 602 illustrating a voltage level of the internal signal, Kick_OSC_Start, and a second line 604 illustrating a voltage level of the internal signal, OSC_Stop. During a first time period 610, the OSC_Stop signal is high to pull the base of the switch 224 of FIG. 1 to ground. During a second time period 612, the OSC_Stop signal is low to disconnect the ground voltage from the switch 224. At the beginning of the second time period 612, the Kick_OSC_Start signal is pulsed to start oscillation of the self-oscillating resonator 220 of FIG. 2. A line 606 illustrates an output of the self-oscillating resonator 220, such as the output node 262. The self-oscillating resonator generates an oscillating output during the time period 612 when the OSC_Stop signal is low and after the Kick_OSC_Start signal is pulsed. When the OSC_Stop signal returns high during time period 614, the output on line 606 stops.

Figure 7:
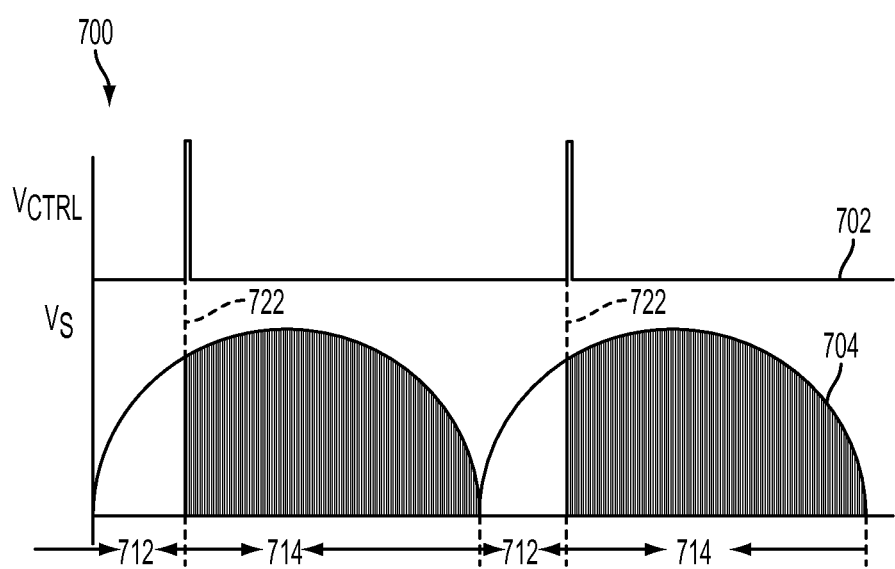
FIG. 7 is a graph illustrating operation of a self-oscillating resonant driver with a dimming phase according to one embodiment of the disclosure.

The internal signals Kick_OSC_Start and OSC_Stop illustrated in FIG. 6 are used to generate a control signal, $V_{ctrl}$, output at pin 252 that couples to the base of the switch 224 of FIG. 2. When combined with a dimming phase at the input voltage, $V_i$, the current through the light emitting diodes (LEDs) 266 may be regulated to provide dimming of the light emitting diodes (LEDs) 266 as shown in FIG. 7. FIG. 7 is a graph illustrating operation of a self-oscillating resonant driver with a dimming phase according to one embodiment of the disclosure. A graph 700 includes a line 702 showing the control signal, $V_{ctrl}$, output at pin 252 of FIG. 2. A line 704 shows an oscillating output at the light output node 262 of FIG. 2. The oscillating output 704 may be enveloped by a rectified alternating current signal. During a first time period 712, the self-oscillating resonator stage 220 is off when the control signal of line 702 is low. After the control signal is pulsed by the controller 240 at time 722, a second time period 714 begins, during which the self-oscillating resonator stage 220 generates an oscillating voltage output. The self-oscillating resonator stage 200 may shut down at the end of the second time period 714 when the oscillating voltage output reaches approximately zero. The self-oscillating resonator stage 200 may restart at time 722 when the control signal is pulsed by the controller 240.

Figure 8:
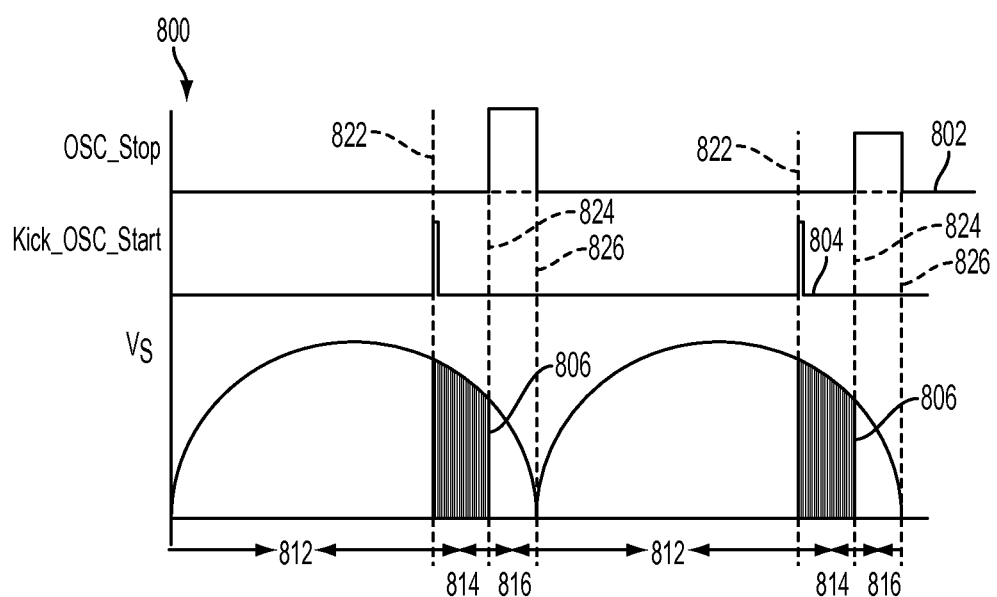
FIG. 8 is a graph illustrating operation of a self-oscillating resonant driver with a dimming phase and duty cycling according to one embodiment of the disclosure.

The combination of the internal signals Kick_OSC_Start and OSC_Stop may be used to perform duty cycling to regulate current through the light emitting diodes (LEDs) 264. FIG. 8 is a graph illustrating operation of a self-oscillating resonant driver with a dimming phase and duty cycling according to one embodiment of the disclosure. A graph 800 includes a line 802 showing the OSC_Stop internal signal and a line 804 showing the Kick_OSC_Start internal signal. A line 806 illustrates an oscillating voltage output, such as the output at the light output node 262 of FIG. 2. During a first time period 812, the self-oscillating resonator stage 220 is off when the internal signal Kick_OSC_Start and OSC_Stop are low. At time 822, a second time period 814 begins with a pulse of the internal signal Kick_OSC_Start to start the self-oscillating resonator stage 220. At time 824, a third time period 816 begins when the internal signal OSC_Stop goes high to stop the self-oscillating resonator stage 220. Thus, a duty cycle for the light emitting diodes (LEDs) 264 may be controlled by the controller 240 by controlling the internal signals OSC_Stop and Kick_OSC_Start to control the duration of the second time period 814 in comparison to the sum of the durations of time periods 812, 814, and 816.

Referring back to FIG. 4, the current regulation by the controller 240 provides for dimming capability for the light emitting diodes (LEDs) 264 when there would otherwise be no dimming capability. That is, the oscillation frequency at the light output node is fixed by the values for the inductor 232 and the capacitor 234 and other non-variable components of the circuit 200. Further, the oscillation voltage at the light output node is fixed. Thus, the method 400 of FIG. 4, along with the circuits illustrated in FIGS. 2-3 allow the control of power transferred to the light emitting diodes (LEDs) 264.

In one embodiment, a resistive digital-to-analog converter (DAC) 504 may be coupled between the pin 252 for the control signal, $V_{ctrl}$, and the pin 248 for the ground voltage, gnd. The DAC 504 may allow fine control of dimming of the load at the light output node without stopping the self-oscillating resonator. For example, the DAC 504 may modify the "on" time of the switch 224 by taking current from the base of the switch 224. This control may allow the controller 240 to regulate current through the light emitting diodes (LEDs) by up to 50% without starting and stopping the self-oscillating resonator 220. The controller 240 may use information from the sense resistor 266 to determine whether to regulate current through the DAC 504 and/or through starting and stopping the self-oscillating resonator 220 with the control signal 252.

In another embodiment, an oscillator sense block 502 may be coupled to the pin 252 outputting the control voltage, $V_{ctrl}$. During oscillation, voltage at the base of the switch 224 may toggle between positive and negative base-to-emitter voltage, $+/-V_{be}$, of the switch 224. The controller 240 may receive this information from the oscillator sense block 502 and use this information as feedback to determine whether oscillation starts after the control signal starts the self-oscillating resonator 220 or stops after the control signal stops the self-oscillating resonator 220.

The parameters and values of components external to the controller 240, such as SOR tank components, converter switches, and transformers, along with the parameters and values of blocks internal to the controller 240 such as the resistor DAC 504 nominal value and also the nominal duty cycling time may be considered in a way that the controller 240 can regulate the LED current to its nominal value regardless of actual values being below or above nominal values. For example, current before the regulation may be above or below a nominal value if the output frequency at the light output node is higher or lower than a designed value, respectively. The controller 240 may then regulate the current through the control signal, $V_{ctrl}$, or the resistive DAC 504 to modify the current to a desired level.

Because the controller does not drive the power converter stage switches, the controller may not require a high voltage process and also it does not consume high power. But, to make sure that there is an auxiliary path to maintain the IC voltage supply level high in an efficient way, a charge pump scheme may be used in some embodiments from the oscillation node to the chip supply pin.

In one embodiment, the circuits 200 and 300 of FIG. 2 and FIG. 3 may be modified to obtain power-factor-correction (PFC). In the proposed non-isolated SOR converter based LED driver with power factor correction (PFC), a diode D3 used for the input voltage peak-rectification may be removed and the value of the capacitor C1 reduced. In this PFC embodiment, all the functionality described above, such as dimmer compatibility and self-oscillating resonator stage operations may be the same as with peak-rectification. However, because there is no input voltage peak-rectification, the self-oscillating resonator stage voltage supply (e.g., a link voltage) may move from a line voltage peak value to a minimum voltage that the self-oscillating resonator stage uses as a supply to build up oscillation. In such a case, a dimmer firing angle is mainly used for the LED light dimming. That is, because the link voltage is not fixed with PFC and the line voltage with the dimmer phase is cut, the PFC circuit may be used for the LED dimming. In the PFC circuit, oscillation may stop from a time that the link voltage (self-oscillating resonator stage's supply) goes below the minimum supply for the oscillation to be sustained until the time the dimmer fires again. The oscillation stop time which depends on the dimmer phase cut angle may provide a natural duty-cycling (start-stop) algorithm similar to the algorithm described above for the peak-rectified version of the proposed topology. Thus, when the line voltage comes up, the controller may sense it and apply the oscillation start pulse to the base of a switch to start the oscillation. In one embodiment, use of a start-up controller internal to the circuit may allow a fast start-up, unlike the conventional DIAC circuit. In a DIAC-based external start-up mechanism, a start-up resistor $R_{start}$ may be large to improve power efficiency, but also slows down the start-up time. Because there is a limitation on the lower side of the link voltage to sustain the oscillation which limits the dimming range of the LED, the start-stop algorithm is also applied to extend the LED dimming range.

Figure 9:
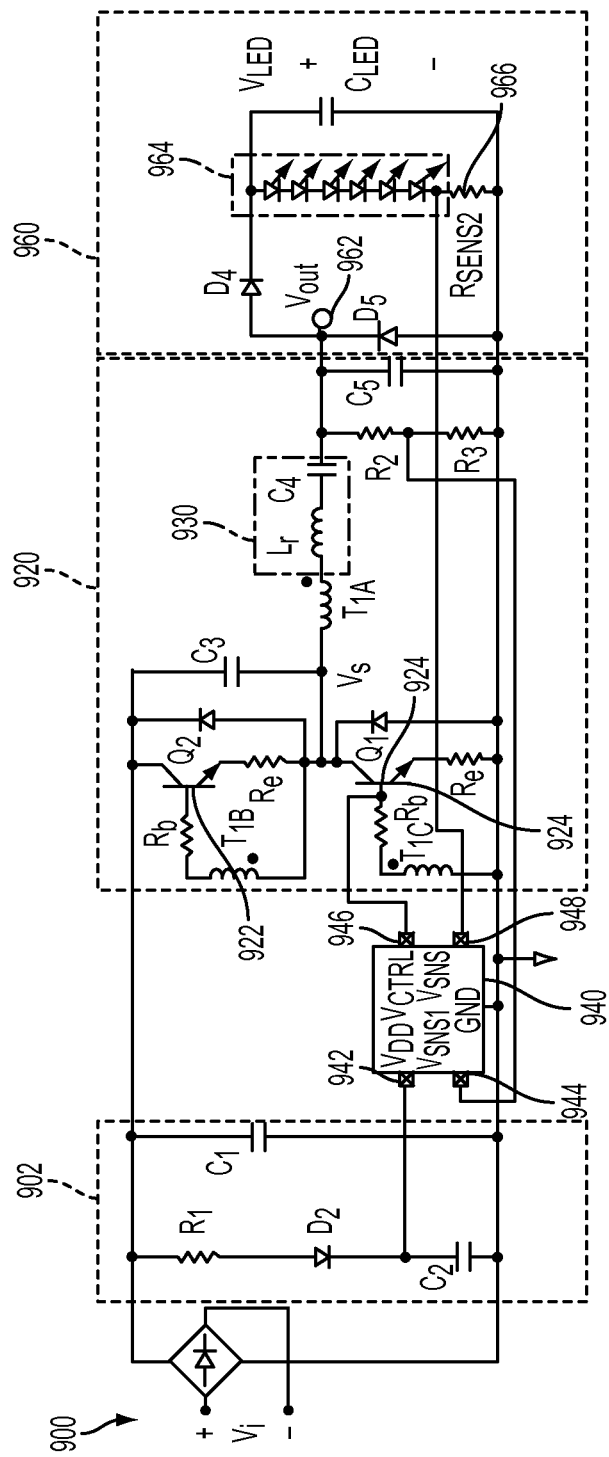
FIG. 9 is a circuit illustrating a self-oscillating resonant driver for regulating current at a load according to one embodiment of the disclosure.

A smaller controller than the controller 240 of FIG. 2 may be constructed without dimming functionality. A controller without dimming functionality may be directly coupled to the input voltage, $V_i$, and have fewer pins than the either pins of the controller 240 of FIG. 2. FIG. 9 is a circuit illustrating a self-oscillating resonant driver for regulating current at a load according to one embodiment of the disclosure. A controller 940 includes, for example, four pins 942, 944, 946, and 948 for coupling to a supply voltage, $V_{dd}$, an oscillation network 930, a control signal, $V_{ctrl}$, and a sense resistor 966, respectively. The controller 940 may regulate current through an output node 962 in a load stage 960 including, for example, light emitting diodes (LEDs) 964. The controller 940 may control current by generating a control signal that controls switches 922 and 924. Additionally, a dimmer compatibility stage 902 may be coupled to the controller 940.

Figure 10:
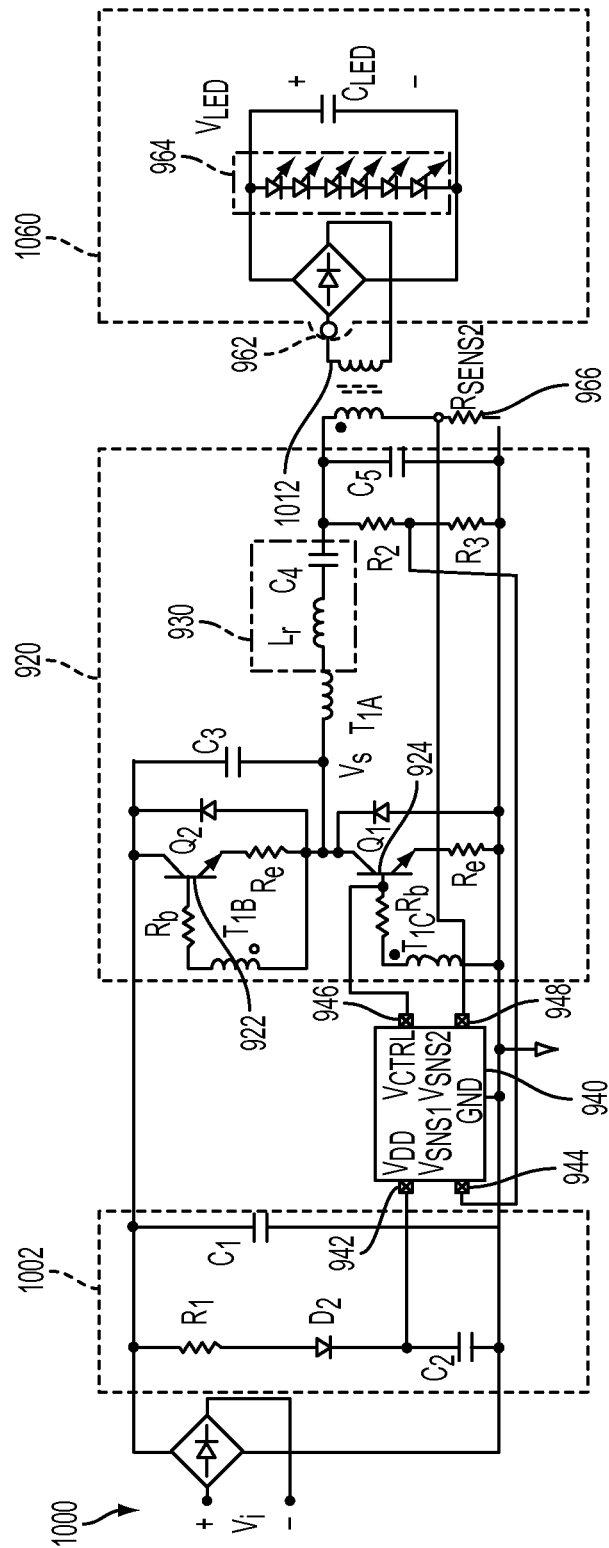
FIG. 10 is a circuit illustrating an self-oscillating resonant driver for regulating current at a load with an isolated controller according to one embodiment of the disclosure.

Another circuit variation implementing the controller 940 is shown in FIG. 10. FIG. 10 is a circuit illustrating a self-oscillating resonant driver for regulating current at a load with an isolated controller according to one embodiment of the disclosure. A circuit 1000 isolates the controller 940 from a load stage 1060 with a transformer 1012.

Figure 11:
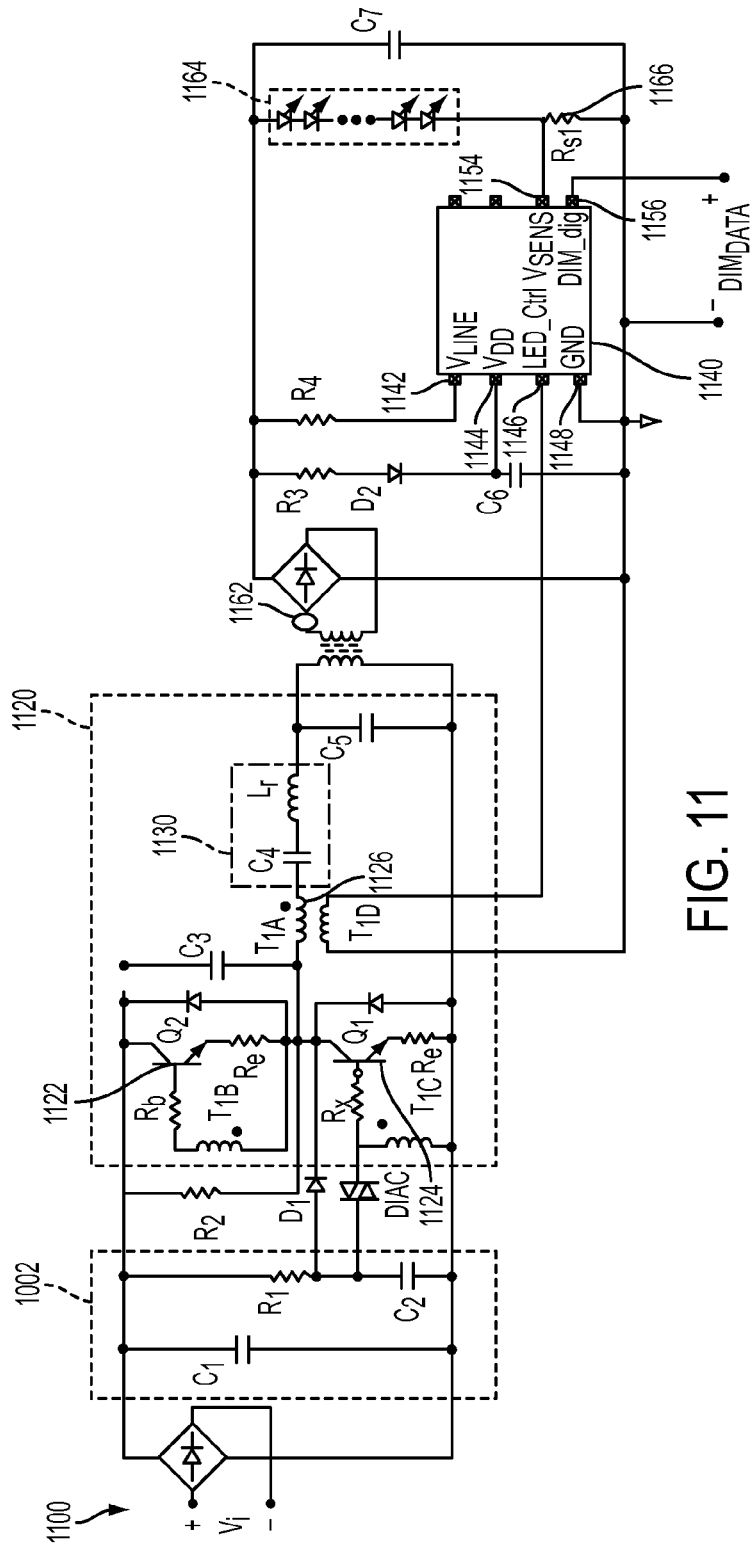
FIG. 11 is a circuit illustrating a self-oscillating resonant driver with auxiliary winding driver control according to one embodiment of the disclosure.

Other embodiments may also include isolation of the controller from the self-oscillating resonator stage. FIG. 11 is a circuit illustrating a self-oscillating resonant driver with auxiliary winding driver control according to one embodiment of the disclosure. A controller 1140 having pins 1142, 1144, 1146, 1148, 1154, and 1156 may be configured to generate a control signal, $V_{ctrl}$, for controlling switching of the switches 1122 and 1124 of a self-oscillating resonator stage 1120. The controller 1140 may be isolated from the switches 1122 and 1124 by a secondary or auxiliary winding of a transformer 1126. The transformer 1126 may also couple the controller 1140 to an oscillation network 1130. Additionally, the self-oscillating resonator stage 1120 may be coupled to a dimmer compatibility stage 1102, such as the dimmer compatibility stage shown or another dimmer compatibility stage. In the embodiment shown in FIG. 11, the controller 1140 may be coupled to a sense resistor 1166 without isolation from the light emitting diodes (LEDs) 1164.

LED dimming data may be received in a digital data format through the DIM_Dig input pin 1156 of the controller 1140. Digitally dimmable LED driver topologies may be used in the wired commercial LED lighting applications such as "DALI," "0-10 v," etc. or in the wireless commercial/residential LED lighting application. One of the reasons for having isolation is being able to have an isolated ground on the LED 1164 side so that it can be connected to the same ground that the digital dim data is referenced. The LED current regulation based on the dimming data may be done by controlling the SOR stage on the primary side via the controller 1140. In this topology, an extra winding of the transformer 1162 may be taken on the secondary side. The extra winding may be connected to the ground pin 1148 and $V_{ctrl}$ pin 1146. To control current through the LEDs 1164, the controller 1140 may start and stop the oscillation network 1130 as described above depending on the digital dim data.

When the circuit 1110 is powered up, the self-oscillating resonator stage 1120 starts operations through a DIAC-based start-up and then delivers power to the secondary side of the transformer 1162 so that the controller 1140 powers up. After start-up, the controller 1140 uses the kick start method described above to start oscillation in the self-oscillating resonator stage 1120. When the controller 1140 has a power supply, the controller 1140 may start receiving the digital dim data. Then, the controller 1140 begins controlling the SOR stage using the start-stop or a resistive DAC algorithm.

Figure 12:
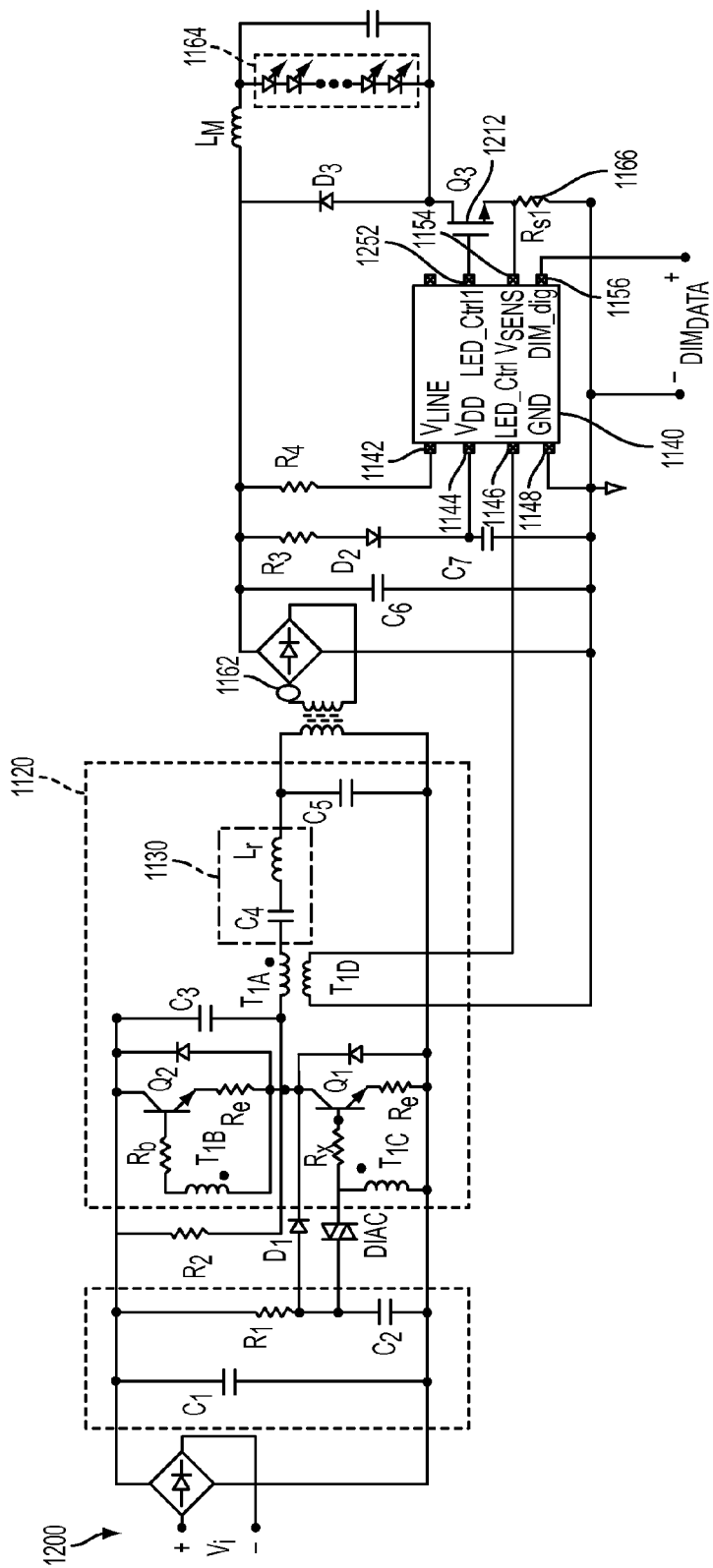
FIG. 12 is a circuit illustrating a self-oscillating resonant driver with auxiliary winding driver control and a buck stage according to one embodiment of the disclosure.

In another embodiment of the circuit of FIG. 11, a current regulating stage may be placed on the secondary-side of the transformer. FIG. 12 is a circuit illustrating a self-oscillating resonant driver with auxiliary winding driver control and a buck stage according to one embodiment of the disclosure. A circuit 1200 is similar to the circuit 1100, but with a switch 1212, such as a field effect transistor (FET). The switch 1212 is coupled to a pin 1252 of the controller 1140.

In the circuit 1200, current regulation through LEDs 1164 based on the digital dim data, $DIM_{data}$, may be done with a buck power converter stage, including the transistor 1212. In this case, because the current through LEDs 1164 is sensed and controlled using a buck stage on the secondary side of the transformer 1126, the self-oscillating resonator stage 1120 may not be controlled through the control signal, $V_{ctrl}$, of pin 1146. Instead, the self-oscillating resonator stage 1120 starts operation after input line voltage is received and then continues delivering power to the secondary side of the transformer 1126. The proposed topology may still use an extra winding of the transformer 1126 coupled to the control signal, $V_{ctrl}$, of pin 1146. In one embodiment, the control signal, $V_{ctrl}$, may be used to stop operation of the self-oscillating resonator stage 1120 when it is not needed to deliver power.

Figure 13:
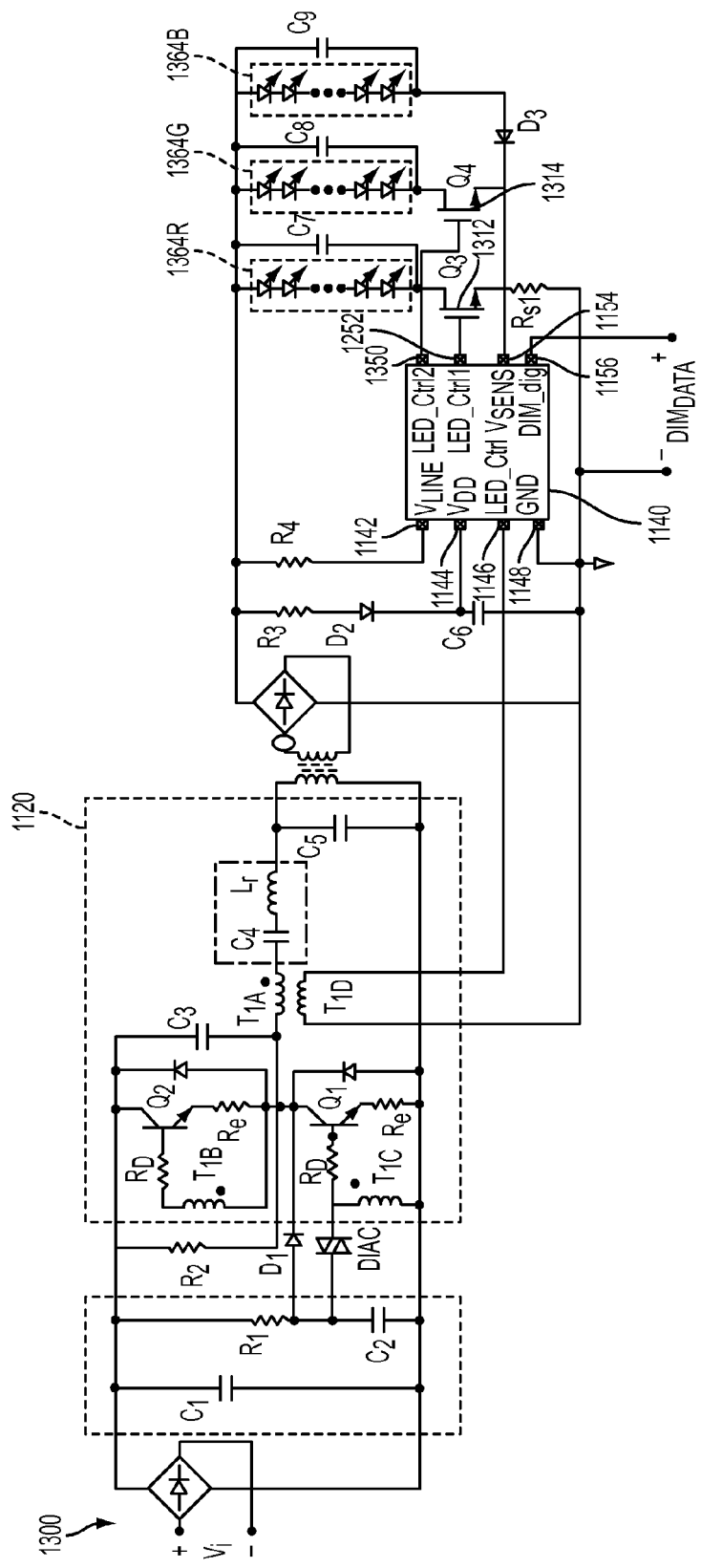
FIG. 13 is a circuit illustrating a self-oscillating resonant driver with auxiliary winding driver control and a buck stage and color mixing according to one embodiment of the disclosure.

In another embodiment, color mixing may be performed along with current regulation through LEDs with a controller. FIG. 13 is a circuit illustrating a self-oscillating resonant driver with auxiliary winding driver control and a buck stage and color mixing according to one embodiment of the disclosure. The controller 1140 of circuit 1300 may be coupled through pins 1350 and 1252 to transistors 1312 and 1314, respectively, to allow color mixing of red light emitting diodes (LEDs) 1364R, green LEDs 1364G, and blue LEDs 1364B.

Although only one embodiment of color mixing is shown in FIG. 13, other digitally dimmable LED driver topologies, such as those described above, may be used for LED color mixing.

If implemented in firmware and/or software, the operations described above, such as with reference to FIG. 4, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a self-oscillating resonator coupled to a light output node, the self-oscillating resonator comprising:
   a first switch;
   a second switch coupled to the first switch,
   wherein an emitter of the first switch is coupled to a base of the second switch; and
   an oscillating network comprising at least one inductor and at least one capacitor, the oscillating network coupled to the first switch and the second switch, and the oscillating network configured to generate an oscillating voltage signal at the light output node; and
   a controller coupled to the self-oscillating resonator, wherein the controller is configured:
   to start and stop the self-oscillating resonator to regulate a current through a load coupled to the light output node, wherein the controller is coupled to a base of the second switch;
   to receive a dim data signal; and
   to time the start and the stop of the self-oscillating resonator to perform duty cycling of the self-oscillating resonator for dimming the load coupled to the light output node based, at least in part, on the received dim data signal.

2. The apparatus of claim 1, wherein the controller is configured to:
   couple a ground voltage to a base of at least one of the first and second switch of the self-oscillating resonator to stop the self-oscillating resonator; and
   apply a pulse voltage to the base of the at least one of the first and second switch of the self-oscillating resonator to start the self-oscillating resonator.

3. The apparatus of claim 1, further comprising at least one light emitting diode (LED) coupled to the light output node, wherein the self-oscillating resonator is configured to control a current through the at least one light emitting diode (LED).

4. The apparatus of claim 3, wherein the at least one light emitting diode (LED) is isolated from the self-oscillating resonator.

5. The apparatus of claim 3, further comprising a sense resistor coupled to the at least one light emitting diode and coupled to the controller, wherein the controller is configured to start and stop the self-oscillating resonator based, at least in part, on a measured current through the sense resistor.

6. The apparatus of claim 5, wherein the controller is configured to provide over-voltage protection (OVP) for the at least one light emitting diode (LED) by controlling the current through the at least one light emitting diode (LED).

7. The apparatus of claim 5, wherein the controller is configured to start and stop the self-oscillating resonator to control ripple in the at least one light emitting diode (LED).

8. The apparatus of claim 3, wherein the at least one light emitting diode (LED) comprises at least three light emitting diodes (LEDs) having at least one red LED, at least one green LED, and at least one blue LED, and wherein the controller is configured to perform color-mixing with the at least one red LED, the at least one green LED, and the at least one blue LED.

9. The apparatus of claim 1, further comprising a transformer coupled between the oscillating network and the first switch and the at least one light emitting diode (LED).

10. The apparatus of claim 9, wherein the controller is coupled to the self-oscillating resonator through an additional winding of the transformer.

11. The apparatus of claim 10, wherein the controller is powered by the self-oscillating resonator through the additional winding of the transformer.

12. The apparatus of claim 1, wherein the controller comprises a variable resistive digital-to-analog converter (DAC) configured to regulate a current through the load coupled to the light output node without starting and stopping the self-oscillating resonator.

13. The apparatus of claim 1, wherein the controller comprises an oscillator sensor configured to detect an output frequency of the self-oscillating resonator and to calculate an approximate line voltage.

14. The apparatus of claim 1, wherein the controller comprises an integrated circuit with pins comprising a positive supply voltage pin, a negative supply voltage pin, a control pin, and a sense pin.

15. The apparatus of claim 1, wherein the self-oscillating resonator comprises a line input node coupled to a line voltage, and wherein the controller is coupled to an output of the oscillating network, and the controller is configured to:
   sense an oscillation frequency of the oscillating network output; and
   calculate the line voltage based, at least in part, on the sensed oscillation frequency.

16. The apparatus of claim 1, wherein the controller is configured to receive the dim data as a digital dim data input having a ground reference identical to a ground reference for the controller.

17. The apparatus of claim 1, wherein the first switch comprises a first bipolar junction transistor (BJT), and wherein the second switch comprises a second bipolar junction transistor (BJT).

18. A method, comprising:
   generating an oscillating voltage output at a light output node from an oscillating network of a self-oscillating resonator comprising a first switch and a second switch;
   receiving a dim data signal;
   starting the self-oscillating resonator by turning on the second switch with a control signal at a first time during a line cycle based, at least in part, on the received dim data signal; and
   stopping the self-oscillating resonator with the control signal at a second time during the line cycle based, at least in part, on the received digital dim data, wherein the control signal starts and stops the oscillating network to regulate a current through a light output load coupled to the oscillating network by duty cycling the self-oscillating resonator for dimming the light output load coupled to the light output node
   generating the control signal from a controller coupled to the self-oscillating resonator, wherein the controller is coupled to a base of the switch and wherein an emitter of the first switch is coupled to a base of the second switch.

19. The method of claim 18, wherein the step of starting the self-oscillating resonator comprises applying a pulse voltage to a base of the second switch of the self-oscillating resonator, and wherein the step of stopping the self-oscillating resonator comprises coupling a ground voltage to the base of the second switch of the self-oscillating resonator to stop the self-oscillating resonator.

20. The method of claim 18, wherein the step of stopping the self-oscillating resonator to regulate a current through a load comprises dimming at least one light emitting diode (LED) coupled to the light output node.

21. The method of claim 18, wherein the step of generating the control signal comprises:
   sensing an output of the self-oscillating resonator;

determining a line input voltage to the self-oscillating resonator; and synchronizing the control signal with the determined line input voltage.

22. The method of claim 18, wherein the step of generating the control signal comprises:

determining an average current through one or more light emitting diodes (LEDs) coupled to the light output node; and generating the control signal based, at least in part, on the average current.

23. The method of claim 18, wherein the step of starting the self-oscillating resonator with the control signal comprises applying the control signal to a secondary winding of an isolation transformer between the oscillation network of the self-oscillating resonator and the first switch.

24. The method of claim 18, wherein the first switch comprises a first bipolar junction transistor (BJT), and wherein the second switch comprises a second bipolar junction transistor (BJT).

25. An apparatus, comprising:

a light source;

a line voltage input node configured to receive a line voltage;

a self-oscillating resonator coupled to the light source and coupled to the line voltage input node, wherein the self-oscillating resonator is configured to output power to the light source during an active phase of a period of the line voltage and configured to not output power to the light source during a dimmer phase of the period of the line voltage wherein the self-oscillating resonator comprises:

a first switch; and a second switch coupled to the first switch, wherein an emitter of the first switch is coupled to a base of the second switch; and a controller coupled to the self-oscillating resonator, wherein the controller is configured to:

start and to stop the self-oscillating resonator to regulate current through the light source, wherein the controller is coupled to a base of the second switch;

to receive a dim data signal; and to time the start and the stop of the self-oscillating resonator to perform duty cycling of the self-oscillating resonator for dimming the load coupled to the light output node based, at least in part, on the received digital dim data signal.

26. The apparatus of claim 25, further comprising a transformer coupled between the self-oscillating resonator and the light source.

27. The apparatus of claim 25, wherein the first switch comprises a first bipolar junction transistor (BJT), and wherein the second switch comprises a second bipolar junction transistor (BJT).

* * * * *